Nov. 5, 1940.     W. M. HOLLOWAY     2,220,107
APPARATUS FOR SOLDERING AND STRIPING CAN SEAMS
Filed Nov. 5, 1936     3 Sheets-Sheet 1
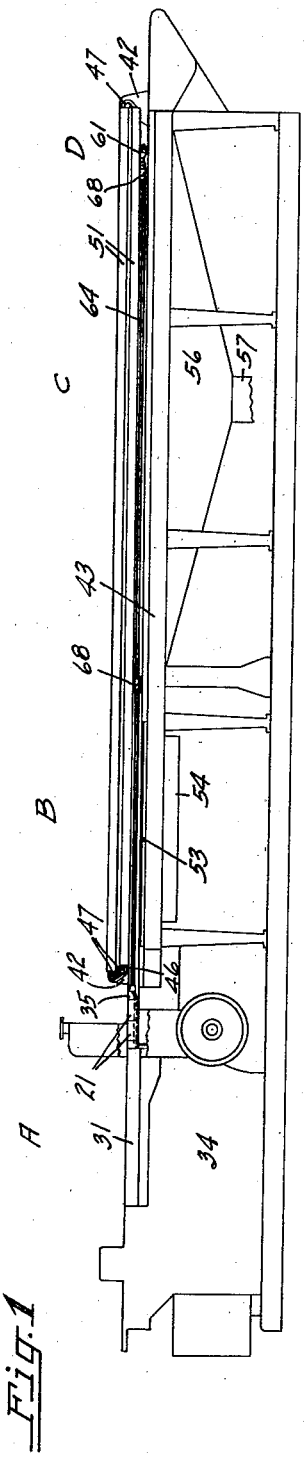
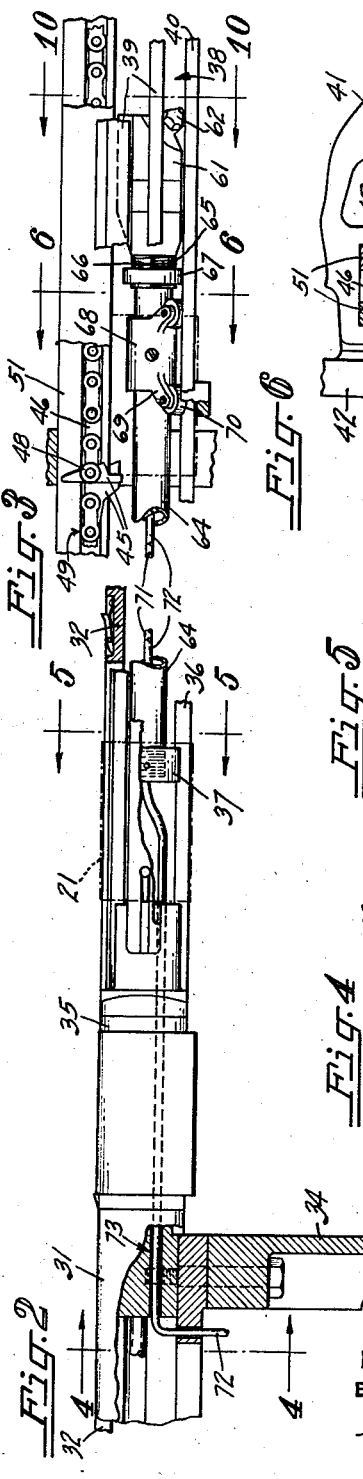
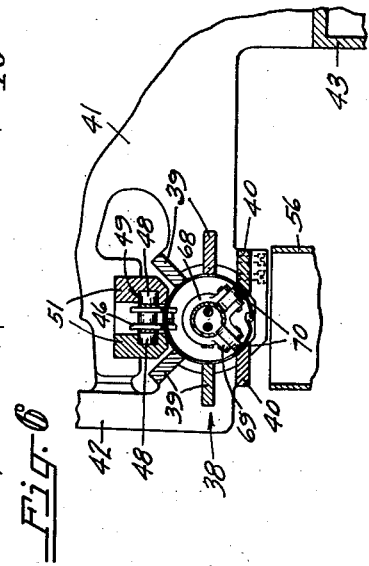
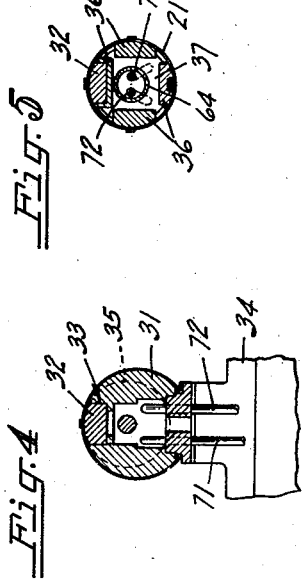

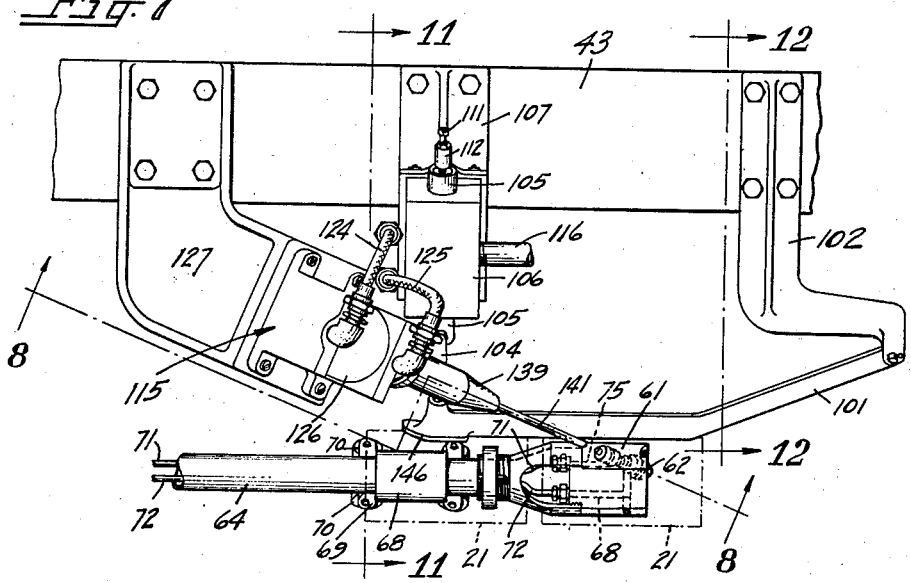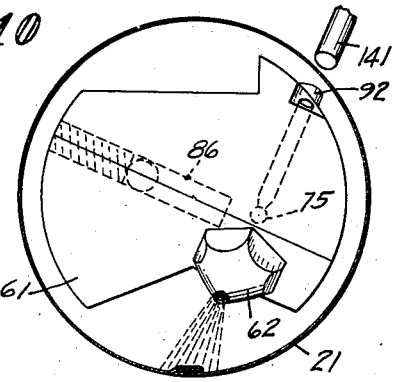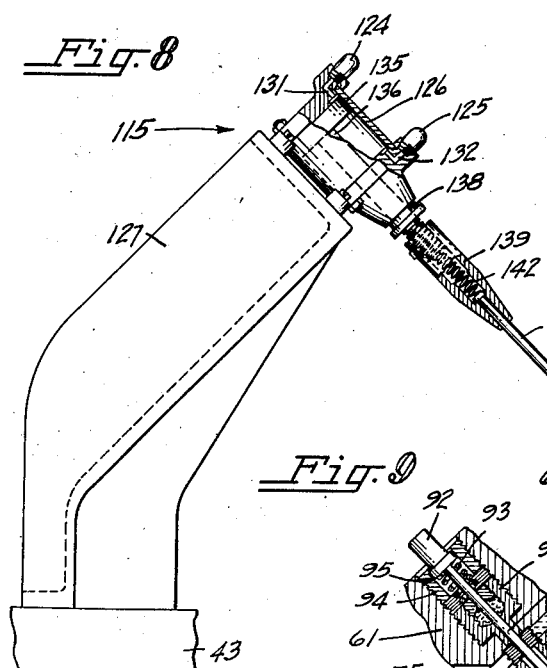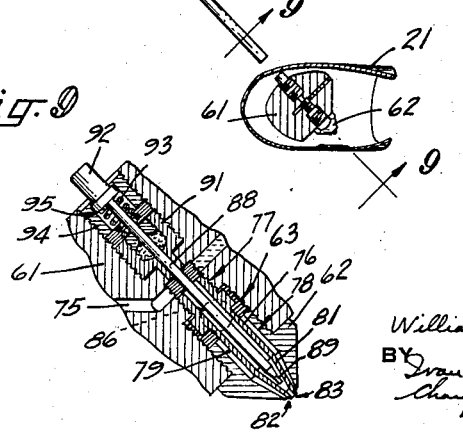

Nov. 5, 1940.   W. M. HOLLOWAY   2,220,107
APPARATUS FOR SOLDERING AND STRIPING CAN SEAMS
Filed Nov. 5, 1936   3 Sheets-Sheet 3

INVENTOR
William M. Holloway
BY
ATTORNEYS

Patented Nov. 5, 1940

2,220,107

UNITED STATES PATENT OFFICE 2,220,107

APPARATUS FOR SOLDERING AND STRIPING CAN SEAMS

William M. Holloway, Oak Park, Ill., assignor to American Can Company, New York, N. Y., a corporation of New Jersey Application November 5, 1936, Serial No. 109,387

11 Claims. (Cl. 113—7)

The present invention relates to a machine for and method of producing a sheet metal can body having a soldered side seam and has particular reference to devices for and method steps of applying a strip of protective coating material to cover the finished soldered seam.

In the manufacture of sheet metal containers or cans for the packaging of such products as those which chemically attack the metal of the can, the interior of the can is usually coated with a lacquer or other suitable coating material to prevent the contents from coming into contact with a wall of the can. This coating material is often put on as two coats, one coat being applied to the flat blank from which the body is made and a second coat after the body is fully formed and soldered.

In applying a coating to the body blank, the side seam edges of the blank are preferably left uncoated so that solder will properly bond with the metal of the body when the side seam is formed and soldered. After the formation of the seam there is some times left a thin line of solder and narrow uncoated surfaces of the can body adjacent the side seam on the inside of the body which are left exposed and are open to attack by the can contents when the can has been filled and sealed. The instant invention contemplates locally coating such exposed surfaces after the body is formed and after its side seam has been soldered, to properly protect the seam parts against such attack.

An object of the invention, therefore, is the provision of a machine for and method of coating can bodies having soldered side seams wherein coating material is applied to the finished soldered side seam in the form of a strip to protect the contents against any exposed solder or other container metal adjacent the side seam.

Another object is the provision of such a machine and such a method wherein pre-cut blanks are formed into can body shape, the side seam formed and soldered, or otherwise bonded, and the finished side seam locally coated with a strip of quick drying coating material, these steps following in rapid succession.

Another object is the provision of a machine of this character wherein can bodies having soldered side seams are produced from pre-coated blanks and the finished soldered seam is covered along a restricted longitudinal area with a protecting coating material as the bodies are moved along suitable supports constituting a horn, the coating elements being disposed within the horn so that the side seams on the inside of the bodies are coated as the latter are moved past the coating elements and while the bodies surround such elements.

Still another object is the provision of a control mechanism for actuating the coating elements in synchronism with the movement of can bodies, the control mechanism being disposed outside the path of travel of the can bodies while the coating elements are located inside their path of travel and are adapted to be telescopically surrounded by the bodies as the latter pass over them.

Numerous other objects and advantages of the invention will be apparent as it is better understood from the following description, which, taken in connection with the accompanying drawings, discloses a preferred embodiment thereof.

Referring to the drawings:

Figure 1 is a diagrammatic side view of a machine embodying the instant invention;

Fig. 2 is an enlarged fragmentary detail of a portion of can body supporting devices and the included portion of coating or spraying elements, the detail being taken intermediate the ends of the machine near the left in Fig. 1, parts being broken away and shown in section;

Fig. 3 is a detail similar to Fig. 2, showing portions of the same devices and elements as disposed at the end of the machine illustrated at the right in Fig. 1, parts being broken away;

Figure 11:
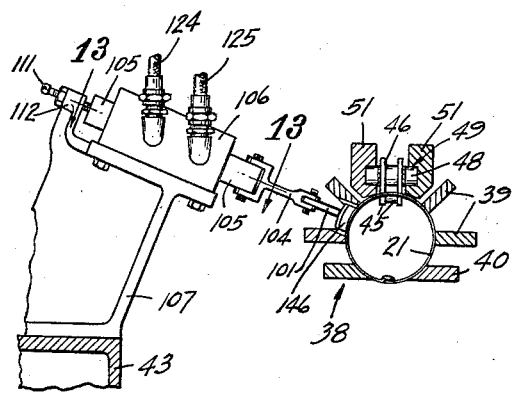
Figure 12:
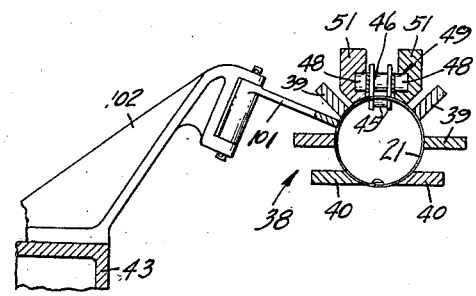
Figure 13:
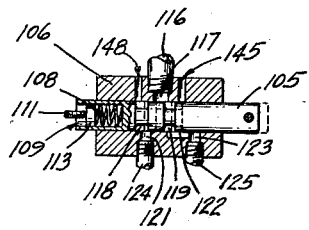
Figure 14:
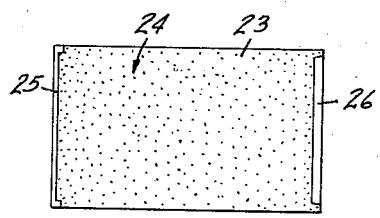
Figure 15:
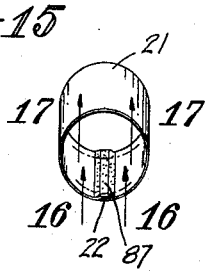
Figure 16:
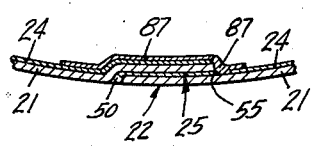
Figure 17:
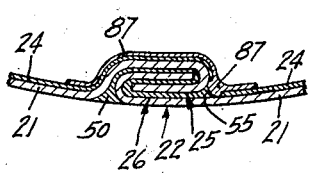

Figs. 4 and 5 are transverse sections taken substantially along the line 4—4 and 5—5, respectively, in Fig. 2;

Fig. 6 is a transverse section taken substantially along the line 6—6 in Fig. 3;

Fig. 7 is a top plan view of the portion of the spraying elements illustrated in Fig. 3, the view also showing control devices which are particularly associated with the spraying elements;

Fig. 8 is a part elevation, part sectional view taken substantially along the broken line 8—8 in Fig. 7, parts being broken away;

Fig. 9 is an enlarged section of a portion of the spraying elements, the view being taken substantially along the line 9—9 in Fig. 8;

Fig. 10 is an enlarged end elevation of a can body and the spraying elements, the view being taken substantially along a plane indicated by the line 10—10 in Fig. 3;

Figs. 11 and 12 are part elevation, part sectional views taken substantially along the lines 11—11 and 12—12, respectively, in Fig. 7;

Fig. 13 is a horizontal sectional detail taken substantially along the line 13—13 in Fig. 11;

Fig. 14 is a top plan view of one form of a pre-coated blank utilized in producing can bodies;

Fig. 15 is a perspective view of a finished can body made from the blank shown in Fig. 14; and Figs. 16 and 17 are enlarged transverse cross-sections of the can body side seam, the views being taken substantially along the curved lines 16—16 and 17—17, respectively, in Fig. 15.

As a preferred embodiment of the instant invention the drawings illustrate a unitary machine structure (Fig. 1) in which sheet metal can bodies 21 (Fig. 15) having interfolded and soldered side seams 22 may be produced from pre-coated blanks 23 (Fig. 14) in a continuous process from blanks to finished bodies as the bodies in their different stages of formation are conveyed from one end of the machine to the other in a continuous procession.

The blanks before entering the machine are preferably pre-coated with a lacquer 24 or other suitable coating material to protect the surface which will be on the inside of the body when the latter is formed into shape. An economical way of applying this coating and one which has been found to produce very good results is by way of a coating machine, wherein the coating is applied as in a pattern onto large sheets. The coated sheets are then cut along the pattern lines to provide the rectangular blanks 23. The blanks thus formed include portions 25, 26 located adjacent the side seam edges of the blank and which are left uncoated to provide for proper soldering of the side seam after the blank is formed into body shape.

In the machine illustrated in Fig. 1 of the drawings the pre-coated blanks 23 are preferably introduced at one end thereof, the left in the figure, which end is preferably designated as a can body forming section A. The blank is moved along a predetermined path of travel in a step by step movement past several working stations each of which performs an operation incidental to the transformation of the blank preferably into a cylindrical can body having an interfolded lock and lap side seam, this being a usual procedure in can manufacture.

At the first of these stations the blank is properly notched along its side seam edges. At subsequent stations the notched blank is bent into body shape, its notched edges formed into hooks for the side seam, the hooked edges brought together into interengagement, and the engaged edges finally bumped or squeezed together to form the side seam.

The formed body is then moved into a side seam soldering section of the machine, this section being indicated by the letter B. Here the formed side seam is brought into engagement with a solder roll which wipes molten solder into the interstices of the seam from the outside of the body. This solder completely fills the seam as shown in Figs. 16 and 17 and seals the seam on the inside of the body along a line adjacent to and between the inside seam and the body wall. It is in large part to the protection of this exposed line of solder on the inside of the body that the present invention is concerned.

After soldering of the side seam the can body is moved into a cooling section C where the high temperature imparted to it during the soldering operation, is sufficiently dissipated to insure final solidifying of the solder.

The partially cooled can body is then passed through a side seam coating or spraying section D which is disposed at the discharge end of the machine shown at the right in Fig. 1. It is in this section that the side seam on the inside of the body is locally coated preferably by spraying with a lacquer or other suitable coating material to cover up and protect the exposed line of solder and any parts of the uncoated interior body wall adjacent the edges of the seam.

In one form of such a machine the can body forming section A includes a mandrel or inside horn 31 on which the body is supported and along which it is moved, in its different stages of formation, to the various working stations hereinbefore mentioned. Movement of the bodies along the horn is effected by a feed bar 32 which is disposed in a groove 33 formed in the top of the horn. This feed bar is reciprocated in any suitable manner in time with the other moving parts of the machine.

The horn 31 is mounted on a main frame 34 and is shaped in cross-section to keep the side seam edges of the partially formed can body spaced apart as shown in Fig. 4 until the body has been moved past certain parts of the machine which are supported on the frame. One end of the horn extends beyond the frame and is reduced to a cylindrical cross-section as at 35 (Figs. 1, 2 and 4) so that the side seam edges may be brought together and interfolded in the usual manner to form the side seam.

This can body forming section of the machine is in effect a regular body maker of which there are many suitable and well known constructions in use. The form used in this machine is preferably similar to the one shown in United States Patent 1,875,353 issued Sept 6, 1932, to John F. Peters, on Can body maker. It is therefore thought that a more detailed description of this section of the machine is unnecessary.

Formed can bodies are passed from the body forming section A to the side seam soldering section B by reciprocation of the feed bar 32. On their way to the section B the bodies are moved along a horn extension comprising a plurality of longitudinal horn bars 36 arranged as shown in Fig. 5. These bars project beyond the end of the reduced diameter portion 35 of the horn 31 and are held in spaced relation at their free ends by a supporting block 37.

The horn bars 36 terminate adjacent the entrance end of the section B and there align with an outside horn 38 to which the formed bodies are transferred by the feed bar 32. The outside horn extends longitudinally of the remaining length of the machine, through the sections B, C, and D. This horn comprises a plurality of radially positioned guide bars 39 and horizontal guide bars 40 which are adapted to engage against the outside of the transferred body to guide it through the remaining sections. The guide bars are secured to brackets 41, 42 which are carried on a frame 43 which supports the various devices associated with the machine sections B, C and D.

A formed can body pushed into the outside horn 38 is conveyed the full length thereof by gripper dogs 45 which are carried on an endless conveyor chain 46 disposed over the top of the horn. The chain takes over suitable sprockets 47 (Fig. 1) carried on the brackets 41 and is moved continuously in any suitable manner in time with the other moving parts of the machine. Intermediate the sprockets the chain is supported against sagging by rollers 48 (Figs. 3 and 6) which are secured to the sides of the chain at spaced intervals along its length. These rollers engage in horizontal grooves 49 formed in the sides of longitudinal guide plates 51 carried in the brackets 41.

The conveyor chain first moves a formed can body through the machine section B where its side seam is soldered. At this section there is provided a suitable solder roll 53 (Fig. 1) which is located in a bath 54 of molten solder supported on the machine frame 43. The body is conveyed over the top of the solder roll so that the outside of the body wall at the side seam engages against the solder roll and receives an application of molten solder as hereinbefore explained. The solder indicated by the numeral 50 (Fig. 17) striking through the interstices of the seam toward the inside of the can terminates in an inner exposed solder line 55 disposed adjacent the terminal edges of the lacquer coating 24 on the can body.

The soldered can body is then conveyed through the cooling section C. At this section an elongated sheet metal funnel or duct 56 directs a blast of air against the body as it is moved along the outside horn 38. The funnel is disposed under the horn and is supported on the frame 43. A pipe 57 formed at the small end of the funnel leads to a suitable blower or the like mechanism which is utilized for blowing the air into the funnel. This air may be ordinary atmospheric air at room temperature or it may be refrigerated or otherwise treated as desired.

Near the end of the machine at the section D (Fig. 1) a spraying head or element 61 (Figs. 3, 7 and 10) is located inside the horn 38 for locally spraying the inside surface of the side seam as the can body is moved along the horn. The spray head is formed with a nozzle 62 threaded into a bore 63 and is adjustably mounted on one end of a long sleeve 64. The end of the head which engages over the end of the sleeve is provided with the usual tapered pipe threads 65 and is cut through with slots 66 so that a clamping collar 67 when turned onto the threads forces the yielding slotted end of the head into tight clamping fit on the sleeve. The head may be turned and set at a desired angle to direct the spray issuing from the nozzle at a predetermined position relative to the body side seam so that the exposed line of solder 55 will be accurately coated. The sleeve extends back through the full length of the outside horn 38 and along the longitudinal center line of the latter.

The inner end of the sleeve 64 terminates adjacent the inside horn 35 and is threaded into the supporting block 37 (Figs. 2 and 5) of the inside horn extension 36. Intermediate this block and the spray head 61 the sleeve is supported by a plurality of collars 68 (Figs. 3 and 6) having lugs 69 carrying rollers 70 which rest upon the horizontal outside horn guide bars 40. This construction permits the passage of a can body along the outside horn 38 without interfering with the spray head supports, the wall of the body readily passing between the horn guide bars 40 and the rollers 70.

The lacquer for spraying the side seam is conducted to the spray head 61 through a conduit or pipe 71 (Figs. 2, 3, 4, 5 and 7) disposed in the sleeve 64. The outer end of the conduit is connected with the spray head while the opposite end extends through a bore formed in the inside horn 31. The inner end of the pipe is bent down inside the frame 34 of the body forming section A at a place where the side seam edges of the partially formed body are still spread apart and leads to a suitable supply of the lacquer.

A similar conduit or pipe 72 is disposed in the sleeve 64 alongside of the pipe 71 and is utilized to conduct a supply of compressed air to the spray head 61. The outer end of the air conduit connects with the spray head while the opposite end extends back through the inside horn 31 in a bore 73 formed adjacent to and parallel with the bore through which the lacquer conduit 71 extends. This inner end of the air pipe is bent down inside the frame 34 and leads to a suitable supply of compressed air, such as for example, a pump or storage tank not shown.

The spray head or outer end of the lacquer conduit 71 and of the air conduit 72 communicate with passageways formed in the spray head 61 which lead to the nozzle 62 for bringing the lacquer and the air together to produce the spray. The lacquer conduit 71 communicates with a passageway 75 (Figs. 7, 9 and 10) which terminates adjacent the entrance end of a tubular nozzle element 76 which is threaded into a bore 77 formed in the spray head concentrically with the nozzle bore 63 and which extends down into a cavity 78 formed inside of the nozzle 62. This nozzle element is smaller in diameter than the cavity so as to provide a clearance space 79 around the outside of the element. The discharge end of the nozzle element is tapered as at 81 and extends into and projects slightly beyond an orifice 82 formed in the end of the nozzle. This tapered end of the nozzle is provided with an orifice 83 through which the lacquer, conducted through the passageway 75 and tubular nozzle element 76, is discharged.

In a similar manner the spray head end of the air conduit 72 communicates with a passageway 86 (Figs. 7, 9 and 10) which leads into the nozzle bore 63 and clearance space 79, thus conducting compressed air through these passages and discharging it through the nozzle orifice 82. The air thus discharged around the lacquer orifice 83 draws the lacquer from the nozzle element 76 and converts it into a spray which is directed against the side seam of the passing can body forming a local film or strip of coating 87 (Figs. 15, 16 and 17) over the top of the seam. This coating covers the exposed line of solder 55 and portions of the body adjacent the seam which may have become exposed during the forming and soldering of the latter.

Provision is made for cutting off the flow of lacquer through the nozzle element orifice 83 when there is no can body present at the section D to receive the spray. For this purpose the spray head is provided with a needle valve 88 one end of which extends into the tubular nozzle element 76 and is formed with a tapered extremity 89 which terminates adjacent the lacquer discharge orifice 83. This extremity of the needle valve is utilized to close the orifice 83 at the proper time.

The opposite end of the needle valve extends through a stuffing box 91 threaded into the spray head 61. This end of the valve is formed with a shouldered button head 92 which is backed up by an expansion spring 93 interposed between the head and the stuffing box to keep the valve in open position until such time as it is desired to close it. A cap 94 threaded in the spray head above the stuffing box and having an aperture 95 through which the bottom head extends holds the valve in place.

Actuation of the needle valve 88 to close the lacquer discharge orifice 83 is effected by a control mechanism operated in accordance with the passage along the outside horn 38 of can bodies moved through the section D. The mechanism is provided with an operating arm 101 (Figs. 7, 11 and 12) disposed adjacent the path of travel of the can bodies along the horn and is of sufficient length to simultaneously engage against the exterior side wall of two properly spaced bodies moving in the procession. Therefore as long as the bodies follow in a continuous and proper timed order the arm will hold the control mechanism inoperative so that the lacquer spray will continue to issue from the nozzle onto the seams of the bodies moving in the procession. If the procession of bodies is broken up so that spaces equal in length to the length of more than one body occurs, the arm 101 moves into the space left by the missing bodies and thereby acts to set a slide valve governing certain air actuated control devices which cut off the spray so that it will not be discharged uselessly into the air.

The operating arm 101 of the control mechanism is pivotally mounted at one end to a bracket 102 which is carried on the machine frame 43. The opposite end of the arm is connected by a link 104 to a slide valve 105 which moves in a valve block 106 carried on a bracket 107 bolted to the frame 43. The slide valve is yieldingly held in one position by a light spring 108 (Fig. 13) which is housed in a recess 109 formed in the end of the valve opposite the link end. The spring tension may be adjusted by a setscrew 111 threaded into a boss 112 formed in the bracket 107. One end of the screw extends into the valve recess 109 and engages against a disc 113 which seats against the spring.

The slide valve 105 controls the operation of a nozzle shut-off device 115 (Figs. 7 and 8) which is actuated by compressed air received from a suitable source of supply such as a pump or tank not shown. This air may be conducted to the valve block 106 by a pipe 116 one end of which is threaded into the valve block. This threaded end of the pipe communicates with a bore 117 (see also Fig. 13) formed in the valve block. Grooves 118, 119 formed in the slide valve 105 are selectively brought into register with this bore 117 by movement of the arm 101.

When the groove 118 is in register with the bore 117 it also aligns with a bore 121 formed in the opposite side of the valve block 106. Similarly when the groove 119 registers with the bore 117 it also aligns with a groove 122 which connects with a bore 123 formed in the valve block adjacent the bore 121. These bores 121, 123 communicate with flexible tubes 124, 125 one end of which is threaded into the bores and the other end into a cylinder 126 associated with the nozzle shut-off device 115.

The cylinder is mounted on a bracket 127 which is bolted to the frame 43. The cylinder end of the tube 124 communicates with a passageway 131 (Fig. 8) formed in the upper part of the cylinder and which leads into the interior of the cylinder. Similarly the cylinder end of the tube 125 communicates with a passageway 132 formed in the lower end of the cylinder and also leads to the cylinder interior.

Within the cylinder there is located a piston 135 which is mounted on the upper end of a rod 136. The lower end of the rod extends through a stuffing box 138 located in the lower end of the cylinder. This lower end of the rod carries a sleeve 139 having a headed stem 141 supported in its free end. The stem projects beyond the sleeve and the sleeve projects beyond the piston rod in longitudinal alignment therewith. A compression spring 142 housed within the sleeve, presses against the headed end of the stem and normally keeps the latter extended and provides for a yielding action between stem and sleeve.

These parts of the nozzle shut-off device 115 are located alongside of the outside horn 38 adjacent the section D. The cylinder 126 and parts connected therewith are disposed at an angle to the horn so that the stem 141 extends toward and in alignment with the button head 92 of the nozzle needle valve 88. The lower end of the stem, however, is disposed normally just outside of the path of travel of the bodies along the horn but is adapted to be projected into engagement with and to depress the button head 92 to shut off the nozzle spray at the proper time.

When an interruption occurs in the line of bodies passing through section D along the outside horn 38, the slide valve spring 108 pushes the operating arm 101 into the space and also moves the slide valve 105 connected therewith so that the groove 118 is brought into register with the bores 117, 121. Compressed air from the supply pipe 116 then flows through bore 117, side valve groove 118, bore 121, flexible tube 124, passageway 131 and enters the cylinder in front of and above the piston 135. This air pushes the piston and the sleeve 139 and stem 141 connected therewith, toward the button head 92 of the nozzle 62.

During this movement of the piston, air in the cylinder behind or beneath the piston is vented through the passageway 132, flexible tube 125, bore 123, grooves 122, 119 and through a vent hole 145 (Fig. 13) formed in the valve block 106 leading to the atmosphere.

During the full lowering action of the piston 135 and stem 141, the latter first engages against the button head 92 and thence presses down the needle valve 88 moving it into nozzle closing position. This cuts off the flow of lacquer from the lacquer orifice 83 but permits the spray air to continue to escape from the nozzle orifice 82. The needle valve is held in this closed position by the piston air acting against the front or top of the piston and until another can body moving into the section D to be sprayed, engages against and shifts the operating arm 101.

During such a resumed flow of can bodies the first approaching body strikes against a tapered end 146 (Fig. 7) of the operating arm 101 and thereby moves the latter out of the path of the bodies and into its original position. This movement of the arm shifts the slide valve 105 so that the groove 119 registers with the bore 117 and with the groove 122 in the valve block 106. The compressed air from the pipe 116 then flows through this bore and groove, through bore 123, flexible tube 125, passageway 132 and enters the cylinder below and in back of the piston.

The piston thereupon moves back into its original position, the air in the cylinder in front of and above the piston being pushed out through passageway 131, flexible tube 124, slide valve groove 118 and thence escaping to the atmosphere through a connecting vent hole 148 (Fig. 13). The upward movement of the piston draws the nozzle shut-off stem 141 away from the buttonhead 92 and out of the path of the approaching can body. This action allows the nozzle spring 93 to withdraw the needle valve 88 out of the lacquer orifice 83. Deposit of the lacquer is thereby resumed so that the side seam of the approaching can body will be locally sprayed as hereinbefore explained.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. In a machine for producing can bodies having soldered side seams, the combination of a horn for supporting the can bodies, a conveyor for moving the can bodies along the horn, spray coating elements disposed inside said horn and arranged to direct a spray of coating material onto the side seams interiorly of the can bodies as the latter are moved along said horn, and instrumentalities controlling the operation of said spray coating elements to turn on and cut off the spray in accordance with the passage of the can bodies past said spray coating elements.

2. In a machine for producing can bodies having soldered side seams, the combination of mechanism for soldering the side seams of the can bodies, means for cooling the soldered can bodies, a horn for supporting the can bodies during soldering and cooling, a conveyor for moving the can bodies along said horn, and spray coating elements disposed inside said horn adjacent said cooling means and arranged to direct a spray of coating material locally onto the soldered side seams interiorly of the can bodies to cover over exposed solder in the side seam while the can bodies are being cooled and as they are moved along said horn.

3. In a machine for producing can bodies having soldered side seams, the combination of can body forming devices, mechanism for soldering the side seams of the can bodies, means for cooling the soldered can bodies, a horn for supporting the can bodies during soldering and cooling, a conveyor for moving the can bodies along said horn, and spray coating elements disposed inside said horn adjacent said cooling means and arranged to direct a spray of coating material locally onto the soldered side seams interiorly of the can bodies to cover over exposed solder in the seam while the can bodies are being cooled and as they are moved along said horn.

4. In a machine for producing can bodies having soldered side seams, the combination of mechanism for soldering the side seams of interiorly coated can bodies having their side seam edges uncoated, spray coating elements arranged to spray a coating material only onto the soldered side seam and portions of the can bodies adjacent thereto and interiorly of the bodies to completely cover over exposed solder and adjacent surfaces of the bodies at the seam inside the bodies, and means for supporting and conveying the can bodies during the seam soldering and spraying operations.

5. In a machine for producing can bodies having soldered side seams, the combination of side seam can body forming devices for uniting the separated edges of can body blanks, a horn having one end adjacent said body forming devices for receiving and for supporting formed can bodies, a conveyor for moving the can bodies along the horn, means for soldering the side seams of said formed can bodies, coating elements including a spray head and nozzle disposed inside said horn at its opposite end and arranged to apply a spray strip of coating material onto the side seams interiorly of the can bodies as the latter are moved along said horn, and conduits leading from the spray head back through said horn and into said can body forming devices at a place where the side seam edges of bodies being formed are still separated, said conduits leading to supplies of coating material and compressed air for producing the spray at the nozzle.

6. In a machine for producing can bodies having bonded side seams, the combination of a horn for supporting the can bodies, a conveyor for moving the can bodies along the horn, means for bonding the side seams of said can bodies, coating devices including a coating applying element disposed within said horn and arranged to spray a narrow stripe of coating material only onto the bonded side seam and portions of the can bodies immediately adjacent thereto and interiorly of the bodies, and devices for supporting said coating elements so that the can bodies will freely move between said horn and said coating devices.

7. In a machine for producing can bodies having bonded side seams, the combination of mechanism for bonding the side seams of interiorly coated can bodies having their side seam edges uncoated, coating devices arranged to apply coating material only onto the interior uncoated bonded side seam and portions of the can bodies adjacent thereto to completely cover all exposed metal surfaces of the interior side seam region, means for supporting and conveying the can bodies during the side seam bonding and coating operations, and means actuated by the absence of a can body upon said supporting means to shut off the coating material to prevent its waste.

8. In a machine for producing container bodies having bonded side seams, the combination of mechanism for bonding the side seams of interiorly coated container bodies having their side seam edges uncoated, spray coating elements arranged to spray a narrow band of coating material only on to the bonded side seam and portions of the container bodies immediately adjacent thereto and interiorly of the bodies to completely cover all uncoated surfaces of the bodies at the seam inside the bodies, and means for supporting and conveying the container bodies during the seam bonding and spraying operations.

9. An apparatus for bonding and coating the side seam of a can body comprising a horn, means for permanently bonding together the side edges of a can body blank to form a tubular can body having an hermetic side seam, coating material applying means for applying a localized stripe of coating material to the inner face of the can body in the region of the bonded side seam, means for presenting said edges in succession to said bonding means and to said coating material applying means, said latter means including a coating material supply pipe extending longitudinally through said horn and a housing for said supply pipe.

10. An apparatus for bonding and coating the side seam of a can body, comprising a horn, means disposed intermediate the ends of said horn for permanently bonding together the side edges of a can body blank to form a tubular can body having an hermetic side seam, coating material applying means disposed adjacent the delivery end of said horn for applying a localized stripe of coating material to the inner face of said body in the region of the bonded side seam, means for presenting the side seam of the can body in succession to said bonding means and said coating material applying means, said latter means including a coating material supply pipe and an air pressure pipe extending longitudinally through said horn.

11. An apparatus for solder bonding and lacquering the side seam of a can body comprising a solder applying means for applying solder to the outer face of the side seam, and a lacquer applying means for applying a stripe of lacquer to the inner face of the can body in the region of the side seam, and means for presenting the side seam of the can body in accurately aligned position in succession to the solder applying means and the lacquer applying means.

WILLIAM M. HOLLOWAY.